US006978370B1

(12) United States Patent
Kocher

(10) Patent No.: US 6,978,370 B1
(45) Date of Patent: Dec. 20, 2005

(54) METHOD AND SYSTEM FOR COPY-PREVENTION OF DIGITAL COPYRIGHT WORKS

(75) Inventor: Paul C. Kocher, San Francisco, CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 09/274,496

(22) Filed: Mar. 23, 1999

Related U.S. Application Data

(60) Continuation of application No. 08/882,511, filed on Jun. 25, 1997, now abandoned, which is a division of application No. 08/707,289, filed on Sep. 3, 1996, now abandoned.

(51) Int. Cl.[7] .............................................. H04L 9/00
(52) U.S. Cl. ..................................... 713/176; 380/201
(58) Field of Search ............................. 713/193, 161, 713/176, 168; 705/51, 57–59; 380/201

(56) References Cited

U.S. PATENT DOCUMENTS

| | | | |
|---|---|---|---|
| 4,598,288 A | 7/1986 | Yarbrough et al. | |
| 5,315,448 A | 5/1994 | Ryan | |
| 5,323,244 A | 6/1994 | Yamaguchi et al. | |
| 5,343,527 A | 8/1994 | Moore | 380/4 |
| 5,418,853 A | 5/1995 | Kanota et al. | 380/5 |
| 5,450,489 A | 9/1995 | Ostrover et al. | 380/3 |
| 5,513,260 A | 4/1996 | Ryan | 380/3 |
| 5,574,787 A | 11/1996 | Ryan | 380/5 |
| 5,590,194 A | 12/1996 | Ryan | 380/5 |
| 5,606,612 A | 2/1997 | Griffin et al. | 380/14 |
| 5,613,004 A * | 3/1997 | Cooperman et al. | 380/28 |
| 5,646,999 A | 7/1997 | Saito | 380/25 |
| 5,687,236 A | 11/1997 | Moskowitz et al. | 380/28 |
| 5,822,436 A * | 10/1998 | Rhoads | 380/54 |
| 5,862,218 A * | 1/1999 | Steinberg | 713/176 |

FOREIGN PATENT DOCUMENTS

EP 0717337 A1 * 6/1994 ........... G06F 12/14

OTHER PUBLICATIONS

Gustavus Simmons Contemporary Cryptology, IEEE Press 1991.*
Lecture Notes in Computer Science, Ross Anderson (Ed.), "Information Hiding," First International Workshop, Cambridge, U.K., May 30-Jun. 1, 1996 Proceedings, Springer.

* cited by examiner

Primary Examiner—Kim Vu
Assistant Examiner—Thanhnga Truong
(74) Attorney, Agent, or Firm—Sonnenschein Nath & Rosenthal LLP

(57) ABSTRACT

Methods and apparati for marking digital material and for detecting marks therein. For mark detection, the material is divided into a plurality of blocks, to which a non-collision resistant compression function is applied. Compression outputs are placed in a shift register, whose value is tested for predetermined values or patterns. Mark embedding may be performed by modifying the data (for example by altering low-order bits and other non-critical regions) such that the outputs of the compression operation, when used as an input to the shift register, yield a predetermined value or pattern. A Hamming Majority operation, computed as the most common bit in a block, may be used as the compression operation, enabling marking and mark detection with material of virtually all types and formats. Mark detection technology may be implemented in media writers and other devices to determine whether the digital material is copyrighted or otherwise protected. An override capability is provided to allow authorized parties to bypass the protection.

10 Claims, 10 Drawing Sheets

METHOD AND SYSTEM FOR COPY-PREVENTION OF DIGITAL COPYRIGHT WORKS

This application is a continuation application of U.S. application Ser. No. 08/882,511, filed Jun. 25, 1997, which is now abandoned, which is a divisional application of U.S. application Ser. No. 08/707,289, filed Sep. 3, 1996, which is now abandoned.

FIELD OF INVENTION

This invention relates primarily to copy protection, and more specifically to systems for preventing unauthorized copying of digital data The invention has specific application to the copy protection of digital information such as images, audio, video, text, and computer programs.

BACKGROUND OF THE INVENTION

The ability to control access and/or distribution of digital data is one of the greatest unsolved technical problems that must be dealt with in the information age. Digital publishers lose billions of dollars due to copyright fraud. Losses include illegal copying of software, video tapes, video games, and audio cassettes. Such copyright fraud ranges from organized large pirating operations in countries where copyright laws are not strictly enforced to individual purchasers of digital works who make two or three copies for friends.

The current art uses cryptography to enforce copyright laws for digital data. Cryptographic techniques are capable of restricting access to confidential data to those who know the appropriate decryption keys. However without special secure hardware to protect the decryption keys, users cannot reliably be prevented from sharing decryption keys, such as by giving them to friends, posting them to computer bulletin boards, selling them, etc. Worse, once the content has been decrypted, it can be copied and distributed freely.

Many copy protection techniques known in the art are limited to computer programs, relying on physical objects which are difficult to copy (such as dongles or media with irregular formatting). The protected program contains special software that tests if the physical object is present and prevents the program from operating if the test fails. This renders copies unusable, since a copy will not function without the presence of the physical object. An example of a technique to fingerprint magnetic media is taught in U.S. Pat. No. 5,428,683. In such a system, digital information about the individual magnetic disk is stored in the physical object. Copies of the content will be on different physical disks, and the individual information will not match. However, the physical object must store information about every magnetic media to be protected. The publisher of a new media must therefore create a new physical object with the new information. This is expensive for the end user and requires considerable technical knowledge to install and use the physical objects.

A related system is discussed in U.S. Pat. No. 4,858,036. This invention protects digital data on magnetic media from unauthorized duplication by dividing the media into two portions. The first portion contains data that can be detected and altered by the read/write device; the second portion contains data that can be detected but not altered by the read/write device. If the second data are not present on a media, this indicates an illicit copy; the reader/writer is disabled.

These techniques do not prevent copying of the raw binary content, but instead attempt to make unauthorized copies of the data useless. This approach can be effective for software which can regulate its own operation, but it cannot be applied to normal data such as digital video, audio, or images. In particular, software can be configured to contain special logic to check whether or not a copy is legitimate. With normal data this kind of copy protection will not work, since the data itself contains value and generally lacks internal logic to regulate its own playback.

Protection systems for normal data thus aim to prevent use of unauthorized copies of the content. Prior-art copy protection systems encrypt the content with a secret key before it is written. (The processes of "writing" content can take many forms, such as storing content on digital media, sending content for transmission over a computer network content to a user, uploading content for broadcast via a computer network, etc.) Note that in addition to keeping keys secret, some systems in the prior art attempt to make the whole encryption method secret, but this does not make any real difference, since methods for recovering secret keys can also recover algorithms.

The encrypted content is obtained by users, then (under normal operation of the system) is decrypted by players (sometimes called readers) which know the correct decryption key. The decrypted data is then optionally uncompressed or otherwise processed, then is sent to an output device (computer display screen, audio system, television, printer, etc.). An unauthorized player should not have a valid decryption key, preventing successful decryption (and hence playback) of the content. For off-line media playback systems, such as digital tape, CD-ROMs, and digital versatile disks (DVDs), every authorized content player would necessarily have to contain copies of all decryption keys. Hardware mechanisms in the player to try to prevent access to the decrypted plaintext and to prevent copying of ciphertext have been attempted, but are frequently broken.

One example of a microprocessor that can be incorporated into readers and players to enforce this type of copy protection is U.S. Pat. No. 5,034,980. A unique ID number is burned into a microprocessor at the time of manufacture. When copy protection of content (software) designed to operate with the microprocessor is desired, the software is encrypted such that it cannot be decrypted without the unique cryptographic code in the microprocessor. If the software or its copy is executed on an unauthorized processor, the decryption will be unsuccessful. This approach requires that the decryption keys remain secret; if a single microprocessor is compromised, all data sent to that microprocessor can be decrypted. The system is most effective if content can be customized for recipients, but unfortunately this is impractical in most commercial environments.

Encryption-based systems of this general type are nevertheless used widely for applications including encrypted satellite television broadcasts and encrypted CD-ROMs. In U.S. Pat. No. 5,513,260, assigned to MacroVision, Ryan discloses such a copy-protection system. The system uses a combination of symmetric (secret-key) and asymmetric (public-key) data encryption to permit the player to handle either copy-protected or non-copy-protected media. (Both of these types of encryption are well known in the art of cryptography.) An authenticating digital signature is recorded on the media, and the media reader prevents the signature from being transferred to illicit copies. The absence of this signature on copy-protected disks causes the player to generate false data which prohibits the disk from playing normally. Therefore, while this system does nothing to prevent copying, the media reader attempts to regulate the use of copies by searching for the digital signature. While the digital signature mechanism can regulate issuance of new content, the system obviously cannot prevent exact copies of the content media from being produced and used by a reader that does not recognize the digital signature. As with the approach in U.S. Pat. No. 5,034,980, compromise of a player's decryption keys enables attackers to decrypt all content it can play.

Digital watermark technologies strive for the detection of illegal copies, rather than their prevention. Unique identifying information is added to each version of the work produces. Each copy made retains the identifying information added at the time of manufacture, allowing the publisher to identify the source of any illegal copies. Digimark Corporation provides such a system with its digital signature technology—allowing a digital signature to be invisibly embedded directly onto photographs, video, computer images, audio, and other forms of creative property. Attempts to remove the digital signature from an image will result in a noticeable degradation in image quality well before the mark is lost, thereby rendering the image useless. Such systems are effective in deterring commercial copyright fraud in which illegal copies are sold to the public, since the watermark data will help identify the original purchaser of the copyrighted work. Casual copying between friends, however, is not deterred since the publisher has no way to know that the copying is occurring. Digital watermarks have the additional disadvantage of working only with specific data types. Skilled attackers who discover the watermark verification process can also remove watermarks without degradation of the underlying information.

To summarize, a major problem common to encryption-based systems is the vulnerability of the keys. Compromise of the key results in system failure. For media players in particular, once attackers reverse-engineer a single player they gain access to the decryption keys for all content playable by that unit. This is a major concern, since attackers using sophisticated reverse-engineering techniques have compromised a wide variety of existing systems, resulting in substantial fraud. In most typical consumer environments, all players must be able to play all content, so compromise of any player yields keys for all content. Other attacks are also possible against these systems. For example, attackers can capture and copy data after it has been decrypted by an authorized decoder and write it to new media. Also, if a single ciphertext stream is playable by a large number of players, attackers can simply duplicate the ciphertext and play it on other units.

The encryption-based approaches thus suffer from many problems:

1. Global secrets must be very heavily protected. In general, security is completely lost if the secrets in even a single player are ever compromised.

2. Some countries strictly regulate the import, export, or use of cryptography. Hardware systems are typically much more tightly restricted than software systems, which may make approaches involving tamper resistant decryption hardware particularly difficult to manufacture, distribute, sell, and use. Some governments may require copies of all decryption keys used, introducing complex logistical requirements as well as additional security risks.

3. Someone who can read the encrypted ciphertext from a storage medium can write an identical disk without needing or knowing the decryption keys. Copies made in this manner can be decrypted and used by any authorized player.

4. Complete specifications for the data decoding process cannot be made public, since decryption keys must be kept secret.

5. Software-based cryptographic decoders cannot be produced, since they can be easily reverse-engineered, revealing the decryption keys. There have been attempts to produce tamper-resistant software systems, but no known techniques are immune to reverse-engineering or can function within the limited memory and processing resources available to typical media playback device drivers.

6. Because software programs will not have access to the decryption keys, software developers will be unable to develop applications to play protected content. Software developers may even be motivated to try to crack the system in order to find the decryption keys required to produce software decoders.

7. The system must prevent access to decrypted plaintext, since otherwise attackers could copy the plaintext data. Consequently such steps as decompression and/or digital-analog conversion must generally occur inside the decryption unit, which in most cases will be outside of the output device (television set, audio speaker, etc.) For digital output devices (such as digital television sets), this will add an unnecessary extra Digital-Analog-Digital conversion which can degrade the signal quality.

8. The protection mechanism is the same for all content and cannot be improved without losing compatibility with existing players.

9. Once someone reverse-engineers a player or otherwise obtains the decryption keys, the whole security model will collapse since attackers can now read, decrypt, and rewrite content with minimal effort. After the initial attack, subsequent attacks thus require very little cost or effort. Historically, security systems relying on global secrets tend to be compromised quickly and are often victims of widespread fraud.

There is no perfect solution to the copy protection problem, since attackers with unlimited resources can always find ways to obtain or recreate the content and distribute it. However, it is possible to significantly increase the cost per successful attack. A successful system attempts to satisfy as many of the following constraints as possible:

1. The system should not be affected by laws and other restrictions on encryption technology.

2. Attackers should be prevented from making exact duplicates of encrypted media, or such duplicates should be unusable.

3. The security system specification should be publishable without destroying the security model.

4. The system should allow for software player implementations, since content playback on standard computers is required for many applications.

5. The system should have no secret encryption keys that can be compromised by reverse-engineering or industrial espionage.

6. Legitimate participants in the system should have no incentive to compromise the security model.

7. Users should have access to raw digital content for playback on digital output devices.

8. There should be minimum system-wide damage resulting from a successful attack or security breach. In particular, no single compromise should destroy the security model.

9. The system should maximize the cost per successful attack.

10. Anyone, including untrusted parties, should be able to issue protected and unprotected content.

Accordingly, it is an object of the invention to design a digital-data protection system which does not require encryption of content, thereby avoiding restrictions governing the manufacture, distribution, sale, or use of encryption technology.

Another object of the invention is to prevent attackers from producing duplicate copies of protected digital content.

Another object of the invention is to allow publication of all specifications for the content reader and, optionally, all specifications for the entire security system.

Another object of the invention is to allow the production and use of software readers without jeopardizing the security of the system.

Another object of the invention is to avoid interfering with legitimate use in order to avoid making otherwise honest participants want to break the security model.

Another object of the invention is to allow users access to the raw digital output, thereby preventing unnecessary Digital-Analog and Analog-Digital conversions.

Another object of the invention is to minimize system-wide security consequences if someone reverse-engineers portions of the system or creates a successful attack.

Another object of the system is to provide a significant barrier to copying, even if all aspects of the security system design are known to an attacker.

Another object of the invention is to support "copy-once" data which may be recorded once by consumers, but cannot later be recopied. Additionally, it is an object to allow the use of more sophisticated protection mechanisms in conjunction with this invention, including "copy-once" data and to control activation of other protection techniques.

Another object of the invention is to be compatible with other copy protection techniques (such as a traditional encryption-based systems) such that both techniques can be used simultaneously to obtain the security advantages of both.

Another object of the invention is to support all kinds of digital data.

Another object of the invention is to provide a protection mechanism which can be implemented and enforced very inexpensively and efficiently in hardware or software.

Another object of this invention is to protect digital data downloaded from computer networks from being retransmitted or copied onto magnetic disks, CD-ROMs, DVDs, or magnetic tapes.

Another object of this invention is to protect digital data on all formats of different media: magnetic disks, CD-ROMs, Digital Versatile Disks (DVDs), magnetic tapes, etc.

Another object of this invention is to work with any digital storage system, including those not yet invented. If implemented in a variety of different systems, it can provide protection with new digital technologies and also prevent cross-media digital copying.

Another object of the invention is to allow anyone to create new protected or unprotected content.

Another object of this invention is to provide a mechanism by which control information can be embedded into data streams.

Another object of the invention is to provide an asymmetric data marking technique for which creation of marked data is generally easier than removal of the marks, even if the mark detection system is known to attackers.

These and other objects of the invention will be apparent to those skilled in the art from the following detailed description of the invention, the accompanying drawings and the appended claims.

SUMMARY OF THE INVENTION

The present invention provides a method and system for providers of copyrighted content in the form of digital data to mark the data during the manufacturing process, such that consumers of the content can read the data but cannot transfer it to an output device, such as a digital storage or computer network interface, without specific authorization from the copyright owner. Thus, the invention provides a highly effective copy-prevention process that allows manufacturers and publishers to sell or rent copyrighted works with added confidence that sales or rental revenue will not be lost to illegal copying.

In one embodiment of the invention, copyrighted data is produced and stored on physical media for distribution to end users using conventional distribution channels. The publisher creates the digital data representing the original content and transmits it to a computer or processor which marks it using a constant copyright mask, and also a constant override mask derived from a secret value referred to herein as an authenticator. The data and authenticator are then sent to a media writer which mass produces copies of the work or produces a master for use in mass duplication of copies. These copies are distributed to end users by conventional means.

The user places the copy in a reader device which reads the data and transmits it to an output device for visual or aural communication to the user by display, playback, printing or the like, depending on the type of data involved. The output device can be a digital storage medium such as a digital versatile disk or alternatively it can be an interface to a computer network. The copyright mark is not visible or audible to the user in the output; however, if the copyright-marked data is sent to a media writer device having a built-in security processor chip, the processor will detect the presence of the copyright mark in the data and will refuse to write the data to the output device without also detecting a write-permission mark which is also embedded in the data, or receiving a valid authenticator which corresponds to the data.

The masking function which is used by the publisher to compute the authenticator or copyright mark, and by the security processor in the user's writer device, to detect the mark is preferably a non collision resistant compression function, and more preferably the Hamming majority value of a block of data. Data which does not contain an embedded copyright mark can be written normally.

In another embodiment of the invention, the data marking technique is applied to associate signal information with the data, such as closed captioning data, auxiliary protection system activation or control signals, content versions, content serial numbers, index information, disc characteristics (playback time, etc.) copyright identifiers, usage data, etc. The data marking system has the useful property of being asymmetric, meaning that it is generally easier for the publisher to mark content than it is for an attacker to erase the marks without affecting the content, even if the mark verification process is known.

DETAILED DESCRIPTION OF PREFERRED EMBODIMENTS

There are two parties involved in this invention: the publisher and the consumer (end user). Publishers are content providers who publish copyright-enhanced digital data. Examples of publishers include movie companies wishing to make movies available on DVDs, cable-television companies wishing to sell premium channels, software companies selling software applications, stock photo houses wishing to sell large collections of photographs, and record companies wishing to sell music on audio compact discs.

The consumer is the person who wishes to read and possibly write the copyright-enhanced digital content on his computer, television, audio system, etc. Publishers are most concerned about restricting end users' ability to make unauthorized copies of their protected content.

The copyright-enhanced digital content is placed on a digital storage media. Digital storage media include digital versatile disk (DVD), video disk, CD-ROM, digital audio tape (DAT), magneto-optical (MO) disk, removable hard disk, etc. The storage media holding the copyright-enhanced data is transferred from the publisher to the consumer. In an alternate embodiment, the digital content is not stored at all, but is transmitted to the consumer via a computer network, satellite broadcast, cable television, radio, or other medium.

Dishonest consumers may try to produce copies of the content on either digital or analog storage media, or transmit the content via a computer network or broadcast medium. The consumer may be able to access the digital storage medium (or received input stream) using a computer; the copyright enhancement system cannot assume that the consumer does not have this ability.

The invention is described for content supplied on digital media. For content received via computer networks, broadcast, etc. a receiver or network interface is substituted for the media reader, but the system is otherwise similar. Similarly, the present embodiment assumes that a consumer is trying to fraudulently copy the content onto another, probably blank, digital medium. For content being copied across computer networks, broadcast mechanisms, etc. a transmitter or network interface is substituted for the media writer, but the system is otherwise similar.

Figure 1:
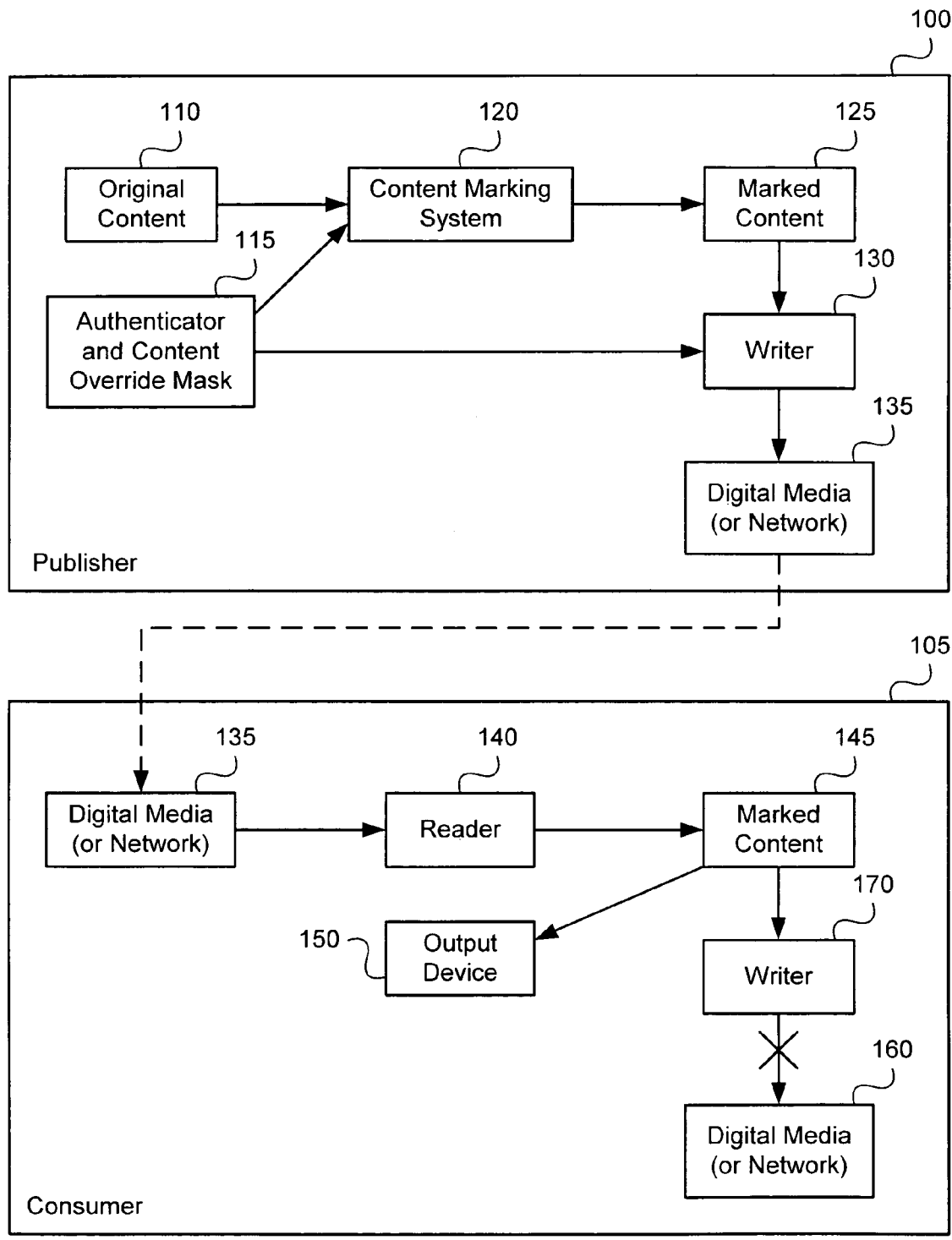
FIG. 1 shows a block diagram of the copy-prevention system in the current invention.

FIG. 1 is a block diagram of the copy-prevention system of the present invention. The apparatus of the present invention comprises content marking system (CMS) (120), publisher's media writer (130), media reader (140), and consumer's media writer (170). Using the above components, the present invention provides a method and system to prevent end users from making unauthorized copies. The present invention receives copyrighted digital data from a publisher, uses the CMS to apply copyright marking to the content, copies the marked content onto digital media, transmits the digital media to the end user, and scans the data for copyright marks when the end user attempts to make a copy.

Referring again to FIG. 1, the publisher (100) owns some original content (110) which he ultimately wishes to record and sell. The publisher first generates an authenticator and corresponding content override mask (115) using the process shown in FIG. 5a. The digital content and the authenticator are then sent to the CMS (120), which uses the process shown in FIG. 8 to produce copyright-enhanced marked content (125). It is cryptographically unfeasible to recover the authenticator from the marked content. The publisher then supplies the content's original authenticator (115) to a media writer (130). Using the process shown in FIG. 2, the media writer's copyright-enhancement processor will allow the content to be written onto the network, digital media master, etc. (135) because it has been provided with the authenticator (115) which corresponds to the content.

The consumer (105) purchases or otherwise obtains the network transmission, broadcast, digital media, etc. (135) from the publisher. The consumer's reader (140) produces the marked content (145). (This is the same marked content (125) that the publisher (100) produced.) The marked content can be played normally on an output device (150) with no further processing. However, the consumer is prevented from making copies of the data. In particular, using the process shown in FIG. 2, the consumer's media writer (170) will reject write requests for copyright-marked data (160) unless the corresponding authenticator (which the consumer does not know) is provided. (The consumer's writer (170) and the publisher's writer (130) have exactly the same security capabilities.)

Figure 2:
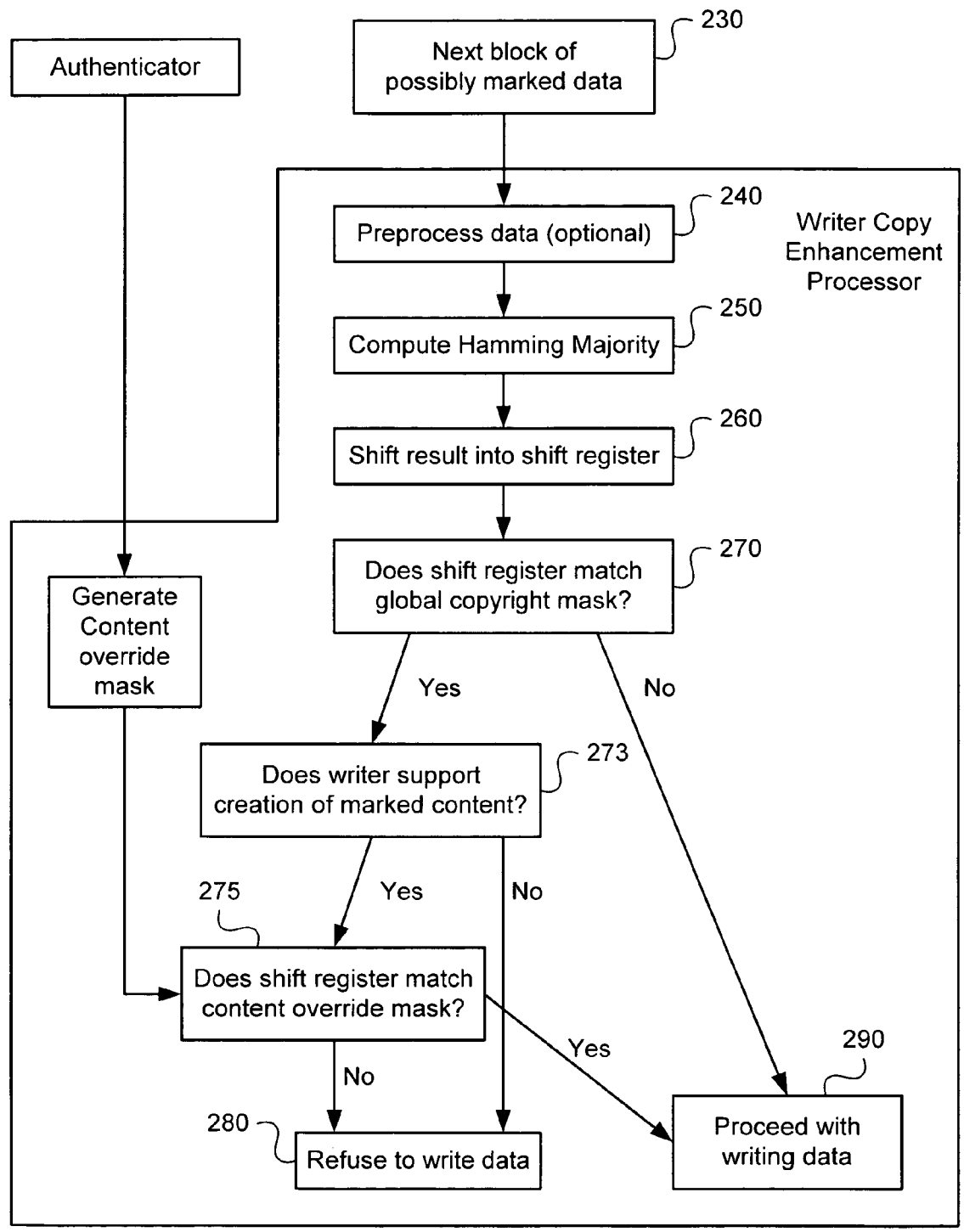
FIG. 2 describes the process steps for enforcing copy-prevention in the digital content writer.

Referring to FIG. 2, the process steps for enforcing copy-prevention in the writer 130 are now detailed. Before content is written, the writer 130 must determine whether the material is copyright-marked and, if so, whether the write request is authorized. To accomplish this, the writer must test for copyright identification marks in the data to be written. To perform this test, the data must be divided (either by the processor or elsewhere) into blocks of at least one bit each. In this preferred embodiment, blocks are adjacent, do not overlap, and are of uniform size. However, the system can also use blocks which partially or completely overlap each other, which are not adjacent, or which are not of uniform size. The block division algorithm may exclude any unused data (such as comments) to prevent attackers from trying to disable protection marks by inserting or modifying unused data regions. For each block to be written, the copy-protect mechanism inside the writer undertakes the following steps:

(1) Receive a new block of data (230). As noted previously, blocks can be of any size which is at least 1 bit. Note that the protection logic can be implemented to process input data blocks serially, so blocks do not need to be buffered.

(2) Optionally preprocess the data (240). Virtually any preprocessing technique could be used, but none is required. For example, preprocessing might constitute exclusive-ORing each data bit with a one-bit register B, then updating B to equal the value of the (new, updated) data bit. Alternatively, every other content bit could be toggled. (These preprocessing operations can help to equalize the fractions of "0" and "1" bits in the data stream.) Preprocessing could also be performed by encrypting the data with a cipher (using either a secret or published key) to mask any natural biases in the data and to make it more difficult for attackers to determine the inputs to the Hamming Majority function. As noted, this preprocessing step is not required.

Figure 2A:
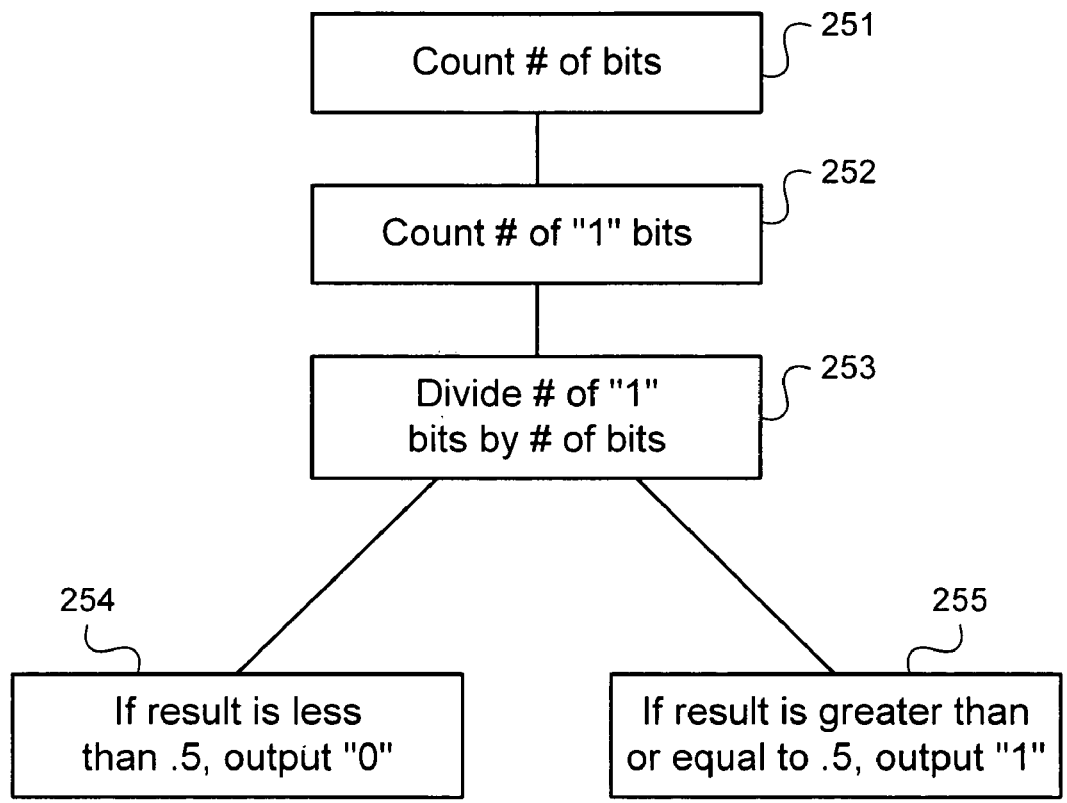
FIG. 2a describes the process steps for computing the Hamming Majority function.

(3) Compute Hamming Majority of the block (250), as shown in FIG. 2a. The Hamming Majority is a mathematical function of at least one input bit, and is well known in the art. The Hamming Weight of a block of data is equal to the number of "1" bits in the data. For example, the binary sequence "0100111011" has a Hamming Weight of 6. The Hamming Average is the average number of "1" bits in the data (0.6 for the above example.) Finally, the Hamming Majority is defined as "1" if the Hamming Average is 0.5 or larger, otherwise "0"; "1" in the above example. The Hamming Majority of a single input bit equals that bit.

(4) Shift the Hamming Majority bit onto a 128-bit shift register (260) such that the old left-hand bit from the shift register is discarded, the Hamming Majority bit appears in the right-hand position, and all other bits are moved one position to the left.

(5) Check (270) shift register for copyright indicator. In the preferred embodiment, this checking process is implemented by testing whether at least 62 of the least significant 64 bits of the shift register match the global copyright mask, a pre-defined 64-bit system-wide constant value. If there is no match, the write request is allowed to proceed (290). If the global copyright mask is detected, the data is assumed to be copyright marked. Note that the probability of an erroneous match is vanishingly small; the probability of an accidental match in 62 of 64 bits is about 1 in $10^{\wedge}\{16\}$.

(6) If a match is encountered on a writer which does not support the creation of new copyright-enhanced material, the write request is automatically denied (273). If the writer is capable of producing copyright-enhanced content, the writer must check (275) whether the content has been authorized by a proper authenticator. This can be achieved by testing whether the content override mask matches the high 64 bits of the shift register. (FIG. 5b shows how the 64-bit content override mask is generated from the authenticator.) In the preferred embodiment, an exact match is required, but other matching functions (such as the 62 of 64 match used for the copyright mask) could also be used. If the content override mask does match, the write is allowed proceed (290). If there is no match, the write request is denied as a copyright violation (280).

FIG. 2a is a detail of the process steps required to calculate the Hamming Majority on a block of data. First, count the number of bits in the data block (251). Then, count the number of "1" bits in the data block (252). Then, divide the number of "1" bits by the number of bits (253). If the result is less than 0.5, output "0" (254). If the result is 0.5 or more, output "1" (255). (This is the Hamming majority, discussed previously.) More optimized forms of this algorithm, such as those which avoid division by comparing the number of "0" and "1" bits or which compute differences in the numbers of "0" and "1" bits, will be understood by those of ordinary skill in the art.

FIG. 2 describes only one embodiment of the present invention; many alternate forms are possible. For example, the Hamming Majority function can be replaced with any other non-collision-free compression function: e.g., the block's parity bit, a digital watermark testing function, the result of processing the block with a linear feedback shift register, etc. Similarly, the matching process (270) can use more sophisticated matching functions than simply comparing the shift register (or other accumulator) with a fixed value. For example, the writer might test whether the low 64 bits of the shift register equal the secure hash of the high 64 bits. The test (275) for a match with the hashed authenticator can also be substituted for a different function, such as testing whether the DES encryption of the upper half of the shift register matches the lower half of the shift register using the authenticator as a DES key. (DES is the Data Encryption Standard, a secret-key encryption algorithm well known in the current art. Details can be found in the U.S. Government's Federal Information Processing Standard (FIPS) 46-1, published by the National Institute of Standards and Technology.) The behavior of writers upon encountering content lacking copy protection marks depends on the security model. In particular, in FIG. 2 the write always proceeds (290) if the mask test (270) fails, but writers might instead require that matches periodically occur if the security policy dictates that all content must be protected.

The testing procedure in FIG. 2 can also be used to activate, control, or enhance other protection techniques. For example, techniques such as those described in U.S. Pat. No. 5,513,260 are often added to analog video signals to prevent recording. Such auxiliary protection is not always desirable, since it can cause picture degradation and is undesirable on unprotected content. For example, the process in FIG. 2 can be implemented in the media reader, such that step 270 is changed to check whether the shift register state corresponds to an activate-analog-protection mask or a disable-analog-protection mask. If the shift register matches either, the player reacts appropriately. Note that multiple instances and uses of the protection system, optionally with different masks, block sizes, etc., may be simultaneously active in a single playback or recording device.

The FIG. 2 approach can also be used to restrict content playback. For example, a publisher might wish to restrict playback by player type, player manufacturer, geographical region, player authorization, etc. Each player is preprogrammed with a set of global copyright masks and/or content override masks corresponding to content it will refuse to play. Players can also contain a set of masks corresponding to content they are expressly authorized to play. At step 270, the shift register is checked against each of these masks. If a content-forbidden mask is found or if content-acceptable masks are required but not present, the player refuses to play the content.

The FIG. 2 approach can also be used to carry control or identification messages, such as closed captioning data, content versions, content serial numbers, index information, disc characteristics (playback time, etc.), copyright identifiers, usage data, etc. One way to receive such messages is to check for a 64-bit data-type identifier (instead of the global copyright mask) in the right half of the shift register in the test at step 270. If the shift register matches the mask, the upper 64 bits of the shift register contain the actual control data. Other variants on this system for carrying control messages and other data will be evident to one of average skill in the art.

The FIG. 2 approach and variants can be applied to systems other than stored media. For example, a system for regulating copyrighted material being transmitted on computer networks would use exactly the same approach, except that instead of writing (290) to physical media, the system transmits the data via a computer network. As with physical media, the copyrighted material could be any digital data, including digital video (including movies, television, etc.), digital audio, graphical images and photographs, Website data, text, computer programs, etc. Note that, given adequate computational power, the CMS can apply copyright markings in realtime, so the system can be used to protect live broadcasts.

Figure 3:
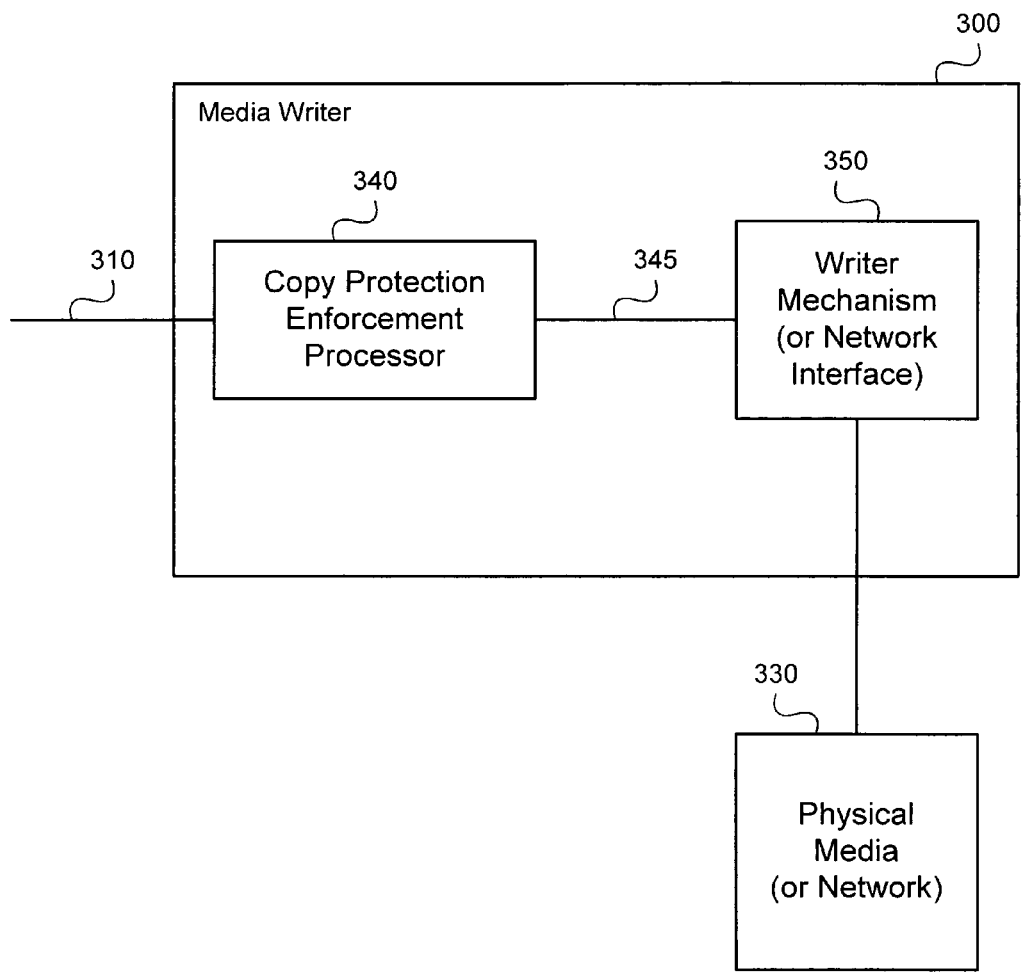
FIG. 3 is a detail of the writer with the copy-protection mechanism installed.

FIG. 3 is a detailed description of a typical media writer (300) using the present invention. The device has a data input (310) for receiving digital content to be written onto the physical media (330). The input (310) can also optionally receive a content authenticator. The digital content first passes through the writer's copyright-enforcement processor (WCEP) (340), which decides whether to allow the requested write operation to proceed.

The writer's WCEP supports two main operations: "WriteData" and (unless the writer lacks support for the production of new protected material) "LoadAuthenticator." The output (345) from the WCEP is sent to the writer mechanism (350), which actually writes the data to the media. A typical WCEP will maintain several instances of the basic protection mechanism, typically with different block sizes, preprocessing functions, and/or global copyright masks. Note that to use the system to protect data on a computer network, the writer mechanism (350) would instead be a network interface and the network would serve as the output device instead of physical media (330). Except for the copy-protection processor, the writing mechanism is identical to conventional digital media recording devices, which are well known in the art.

Figure 4:
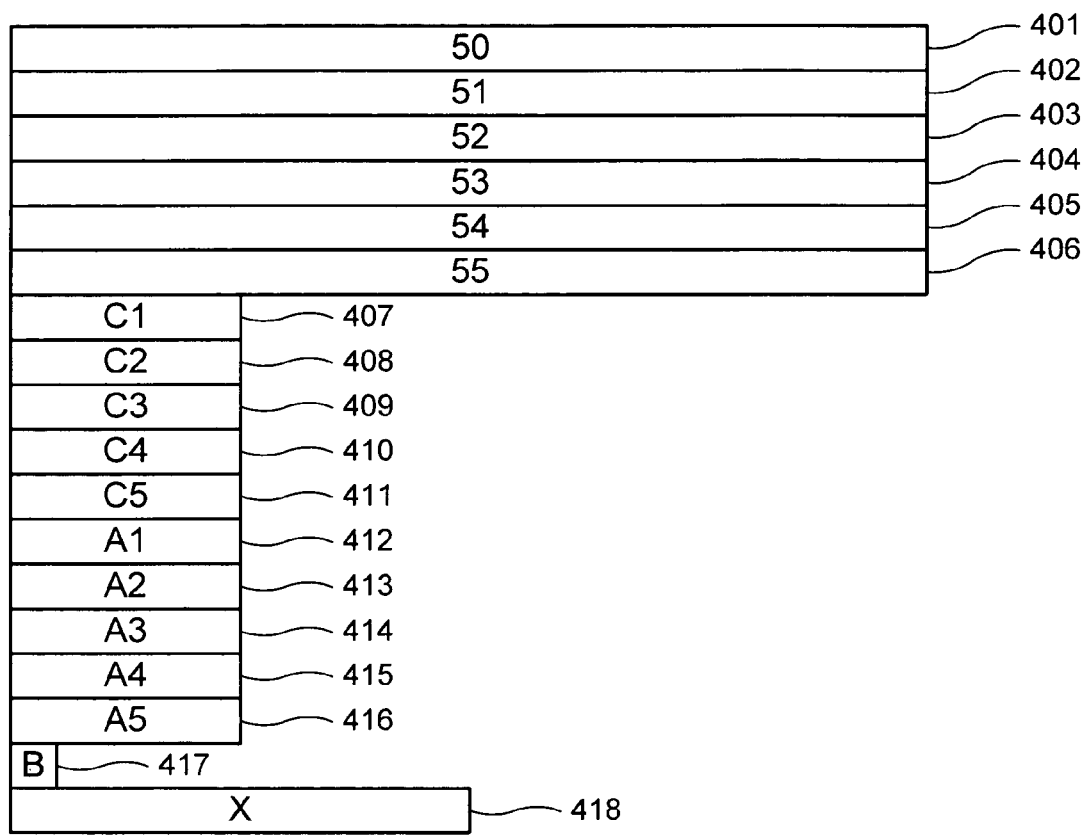
FIG. 4 is a detail of the state variables stored in the memory of the writer's copyright-enforcement processor.

A specific WCEP implementation will now be described which includes six shift registers loaded using different block lengths. FIG. 4 lists the writer state variables (400) for the specific implementation to be described. In this embodiment, the writer needs approximately 993 bits of state information. No nonvolatile storage is required; all state information may be stored in RAM. On power-up, insertion of a new media disc, etc. all register contents should be reset to zero. S0 (401), S1 (402), S2 (403), S3 (404), S4 (405), and S5 (406) are each 128-bit shift registers. C1 (407), C2 (408), C3 (409), C4 (410), and C5 (411) can each be 16-bit counters, though some can be made smaller. A1 (412), A2 (413), A3 (414), A4 (415), and A5 (416) are also each 16-bit or smaller counters. B (417) is a 1-bit register. Finally, X (418) is a 64-bit field used as the content override mask.

To summarize FIG. 4, the following table shows the variables used in the preferred embodiment:

| Variable | Description |
| --- | --- |
| S0 . . . S5 | Shift registers (128 bits each) |
| C1 . . . C5 | Counters (16 bits or less each) |
| A1 . . . A5 | Counters (16 bits or less each) |
| B | One-bit register |
| X | Content override mask (64 bits) |

Figure 5A:
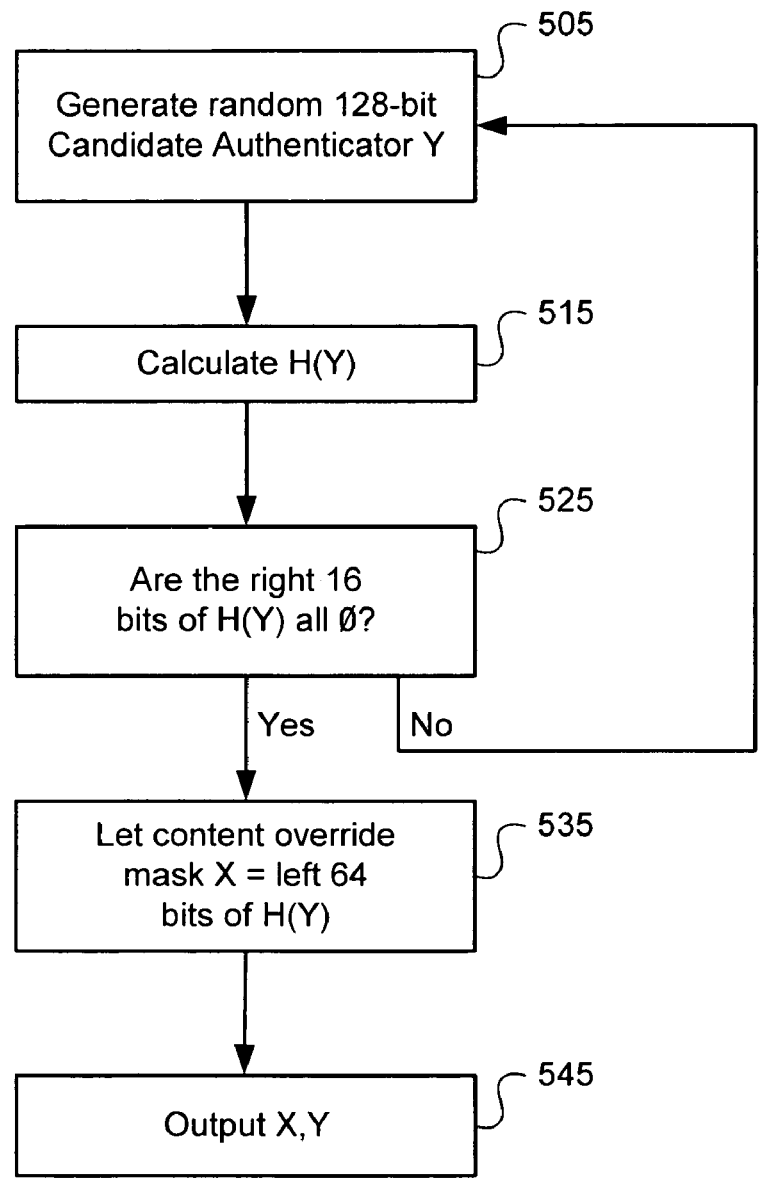
FIG. 5a describes the process steps for generating a new authenticator.
Figure 5B:
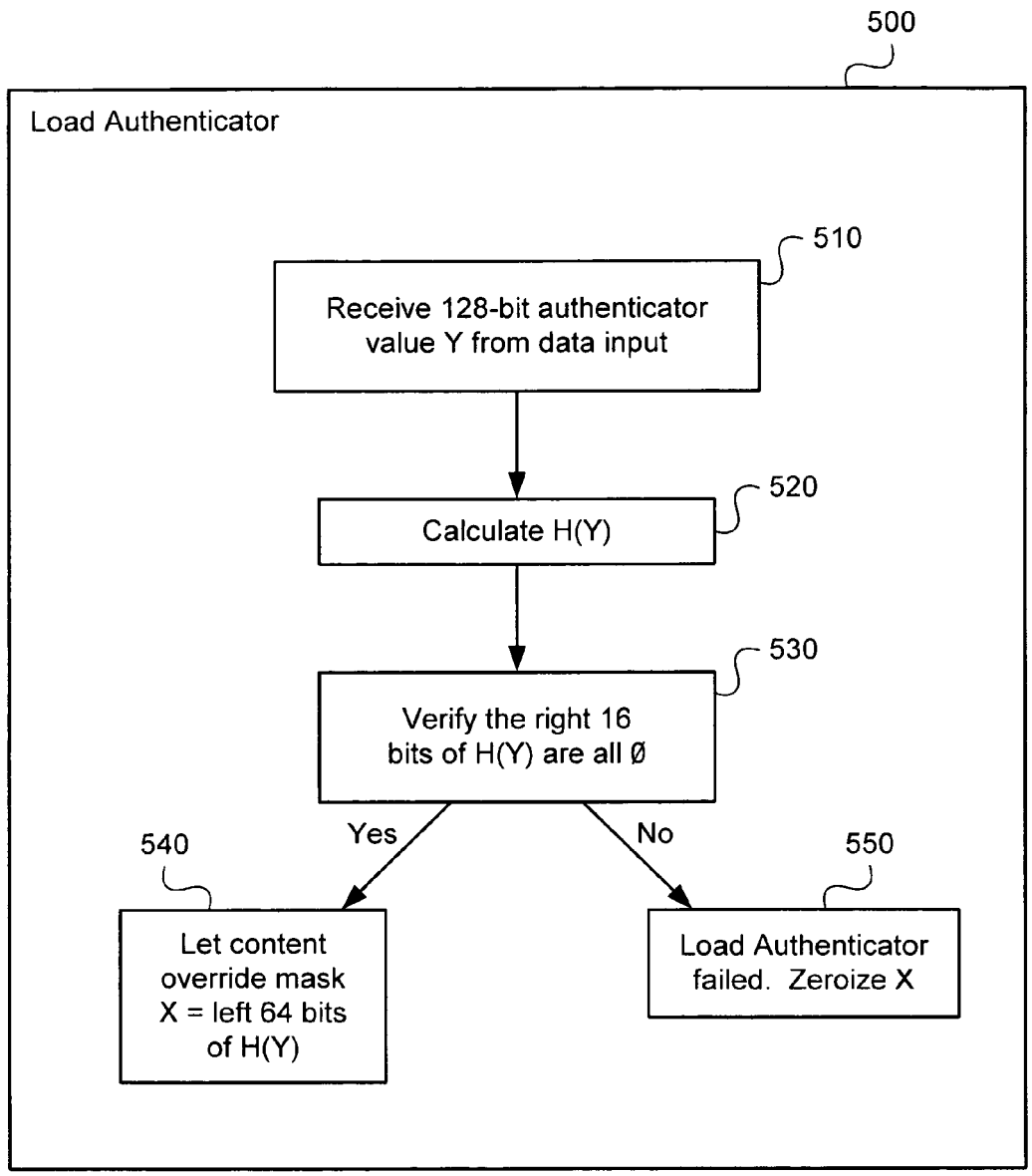
FIG. 5b describes the process steps for the LoadAuthenticator operation in the writer.

FIG. 5a shows the steps required by a publisher to generate an authenticator (see item 115 in FIG. 1) for a new piece of content:

(1) In step 505, the publisher begins by creating a random 128-bit candidate authenticator Y (505).

(2) In step 515, the publisher then computes H(Y), where H denotes a cryptographic hash function. Cryptographic hash functions are well known in the art of cryptography. Also called one-way hash functions, cryptographic hash functions take a variable-length input M and output H(M) such that (except by searching for M using brute force) it should not be possible to find a specific input M given a specific output H(M), even if the algorithm H is known to the attacker. Examples of hash functions are MD2, MD4, MD5, SHA, and RIPE-MD. See, for example, Bruce Schneier's Applied Cryptography, 2nd Edition (John Wiley & Sons, 1996) for a description of these one-way hash functions.

(3) In step 525, the publisher then checks whether the right-hand 16 bits of H(Y) all equal zero. If not, the entire process is restarted. On average, one Y value in 65536 will be valid.

(4) In step 535, the publisher sets the content override mask X to equal the left-hand 64 bits of H(Y).

(5) At step 545, the final X and Y contain the content override mask and authenticator, respectively.

FIG. 5b shows the process steps for the "LoadAuthenticator" operation (500). This operation provides publishers with a mechanism to override the writer's protection enforcement only for content which they have produced. (Without a valid authenticator, the writer will reject all attempts to write protected content.) To initialize the authenticator, the writer uses a cryptographically secure hash function to convert a publisher-supplied content-specific authenticator Y into a 64-bit content override mask X as follows:

(1) In step 510, receive a 128-bit authenticator Y (510) from the data input. (FIG 5a shows the steps taken by the publisher to generate Y.)

(2) In step 520, use the cryptographic hash function H to calculate H(Y).

(3) Verify that the right-hand 16 bits of H(Y) are all zero (530). If not, the LoadAuthenticator process fails and the writer clears X.

(4) Set the content override mask X to equal the left-hand 64 bits of H(Y) (540).

The requirement that the right-hand 64 bits of H(Y) equal zero makes it more difficult for an attacker to use brute force search to find a Y which hashes to a target X. Note that it is critical that writers do not allow direct control over the content override mask from the data input, but instead are only able to load authenticator values which are cryptographically hashed to produce X.

Figure 6:
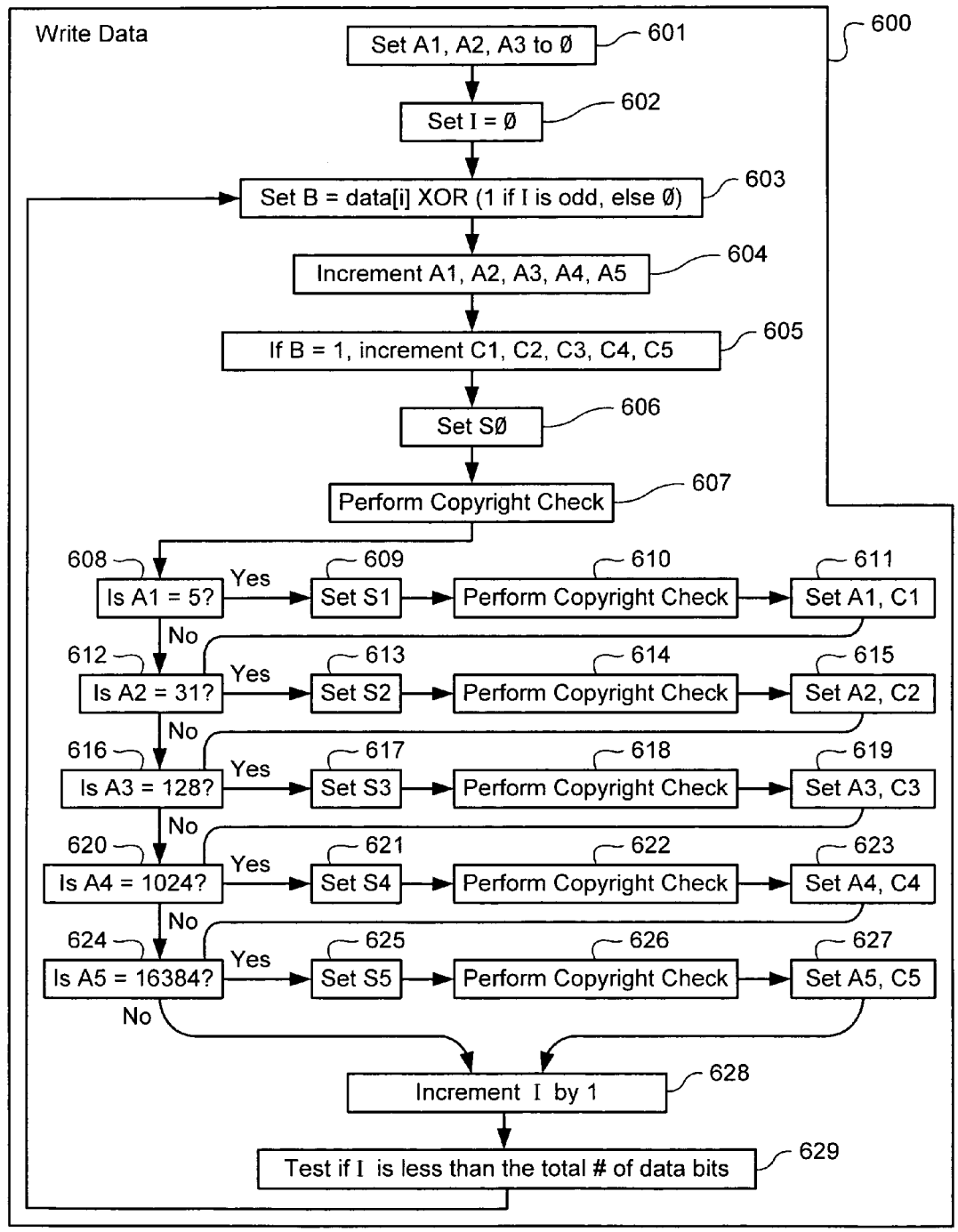
FIG. 6 describes the process steps for the WriteData operation in the writer.

FIG. 6 shows the process steps for the "WriteData" operation (600). This operation is performed by the copy-protection processor in the writer for every sector or other segment of data to be written. Note that all operations in FIG. 6 can be implemented efficiently in hardware or software.

First, when the writer is initialized, new media disc is loaded, etc., set variables A1, A2, and A3 to zero (601). Then, set i to zero (602). Set B equal to the exclusive-OR of B and data[i] (603). Increment A1, A2, A3, A4, and A5 by one (604). If B=1, then increment C1, C2, C3, C4, and C5 by one (605). Set S0 equal to S0 shifted left one bit, discarding the previous left-hand bit and placing B as the new right-hand bit (606). Perform the "CopyrightCheck" operation—described below and in FIG. 7—on S0 and a constant global copyright mask of 0x92ABC79E99F157FC (607). (Global copyright masks values have been chosen arbitrarily; they will be different in different embodiments.)

Test if A1 equals 5 (608). If so, set S1 equal to S1 shifted left one bit. If C1 is less than three then make the least significant bit of S1 equal to zero, otherwise make this bit a one (609). Next, perform CopyrightCheck on S1 with the global copyright mask 0xC84D57481F7D5757 (610). Finally, set both A1 and C1 to zero (611).

Test if A2 equals 31 (612). If so, set S2 equal to S2 shifted left one bit. If C2 is less than 16 then make the least significant bit of S2 equal to zero, otherwise make this bit a one (613). Next, perform CopyrightCheck on S2 with the global copyright mask 0x92ABC79E99F157FC (614). Finally, set both A2 and C2 to zero (615).

Test if A3 equals 128 (616). If so, set S3 equal to S3 shifted left one bit. If C3 is less than 64 then make the least significant bit of S3 equal to zero, otherwise make this bit a one (618). Next, perform CopyrightCheck on S3 with the global copyright mask 0xC84D57481F7D5757 (618). Finally, set both A3 and C3 to zero (619).

Test if A4 equals 1024 (620). If so, set S4 equal to S4 shifted left one bit. If C4 is less then than 512, then make the least significant bit of S4 equal to zero, otherwise make this bit a one (621). Next, perform CopyrightCheck on S4 with the global copyright mask 0x92ABC79E99F157FC (622). Finally, set both A4 and A5 to zero (623).

Test if A5 equals 16384 (624). If so, set S5 equal to S5 shifted left one bit. If C5 is less than 8192 then make the least significant bit of S5 equal to zero, otherwise make this bit a one (625). Next, perform CopyrightCheck on S5 with the global copyright mask 0xC84D57481F7D5757 (626). Finally, set both A5 and C5 to zero (627).

After each iteration, increment i by one (628). Test if i is less than the total number of data bits (629). If it is, then go to step (603). Otherwise, the input data has all been processed so algorithm terminates.

Figure 7:
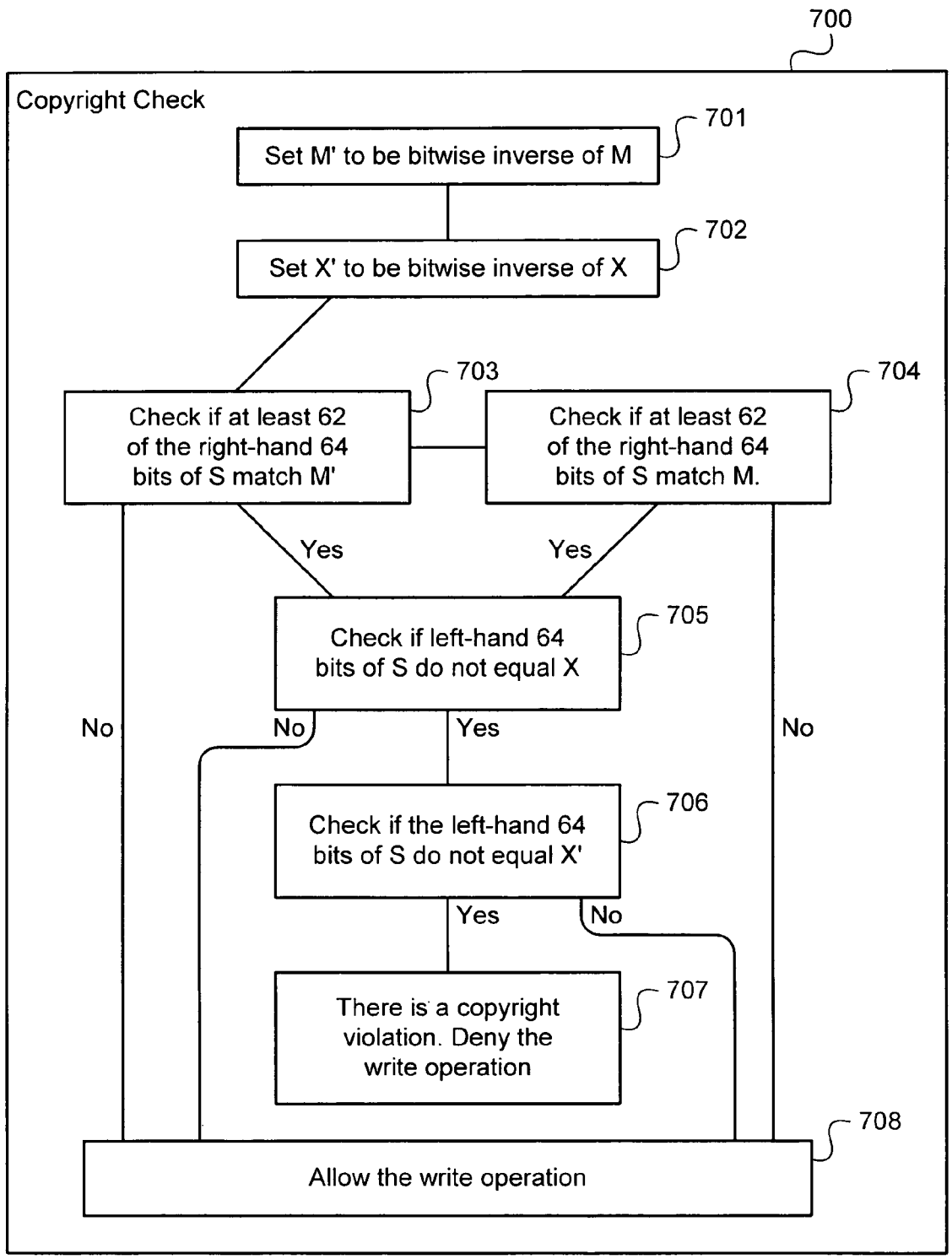
FIG. 7 describes the process steps for the CopyrightCheck function of the WriteData operation.

The following pseudocode also describes the "WriteData" operation depicted in FIG. 6. In the notation below, data[i] refers to bit i of the data being written. For example, data[0] would be the most-significant bit of the first byte of the data.
Let A1=0, A2=0, and A3=0.
—Don't clear B, S0 . . . S5, A4, A5, etc. —
For i=0 upto totalDataBits-1:
Let B=B XOR data[i]. —XOR=exclusive-OR—
Increment A1, A2, A3, A4, and A5.
If B=1 then increment C1, C2, C3, C4, and C5.
Let S0=SHL(S0)+B. —SHL=shift left—
CopyrightCheck(S0, 0x92ABC79E99F157FC).
If A1=5 then:
  Let S1=SHL(S1)+(0 if C1<3 else 1).
  CopyrightCheck(S1, 0xC84D57481F7D5757).
  Let A1=0 and C1=0.
EndIf.
If A2=31 then:
  Let S2=SHL(S2)+(0 if C2<16 else 1).
  CopyrightCheck(S2, 0x92ABC79E99F157FC).
  Let A2=0 and C2=0.
EndIf.
If A3=128 then:
  Let S3=SHL(S3)+(0 if C3<64 else 1).
  CopyrightCheck(S3, 0xC84D57481F7D5757).
  Let A3=0 and C3=0.
EndIf.
If A4=1024 then:
  Let S4=SHL(S4)+(0 if C4<512 else 1).
  CopyrightCheck(S4, 0x92ABC79E99F157FC).
  Let A4=0 and C4=0.
EndIf.
If A5=16384 then
  Let S5=SHL(S5)+(0 if C5<8192 else 1).
  CopyrightCheck(S5, 0xC84D57481F7D5757).
  Let A5=0 and C5=0.
EndIf. EndFor.
CopyrightCheck(S,M)—used in FIG. 6 and the pseudocode for "WriteData", above—checks for copyright material which is not authorized by the authentication field X. FIG. 7 shows the process steps for the CopyrightCheck (S,M) operation (700). This operation has two inputs, S and M, corresponding to the shift register state and the global copyright mask, respectively. The CopyrightCheck function also accesses the content override mask.

First, set M' to be the bitwise inverse of M (701). Then, set X' to be the bitwise inverse of X (702). Check if at least 62 of the right-hand 64 bits of S match M' (703). Also check if at least 62 of the right-hand 64 bits of S match M (704). If either of them do, then check if the left-hand 64 bits of S do not equal X (705). Also check if the left-hand 64 bits of S do not equal X' (706). If both of those checks are true, then there is a copyright violation and the writer should deny the write and respond appropriately. (Typical responses include entering an error state, ejecting the media, permanently destroying or locking the media, alerting the operator, etc.)

The following is pseudocode for the "CopyrightCheck" operation, depicted in FIG. 7: Let
M'=M XOR 0xFFFFFFFFFFFFFFFF.
Let X'=X XOR 0xFFFFFFFFFFFFFFFF.
If (at least 62 of right-hand 64 bits of S match M') or
  (at least 62 of right-hand 64 bits of S match M) then:
    If (left-hand 64 bits of S) !=X and
    (left-hand 64 bits of S) !=X' then:
      CopyrightViolation(). —Deny write—
    EndIf.
  EndIf.

Figure 8:
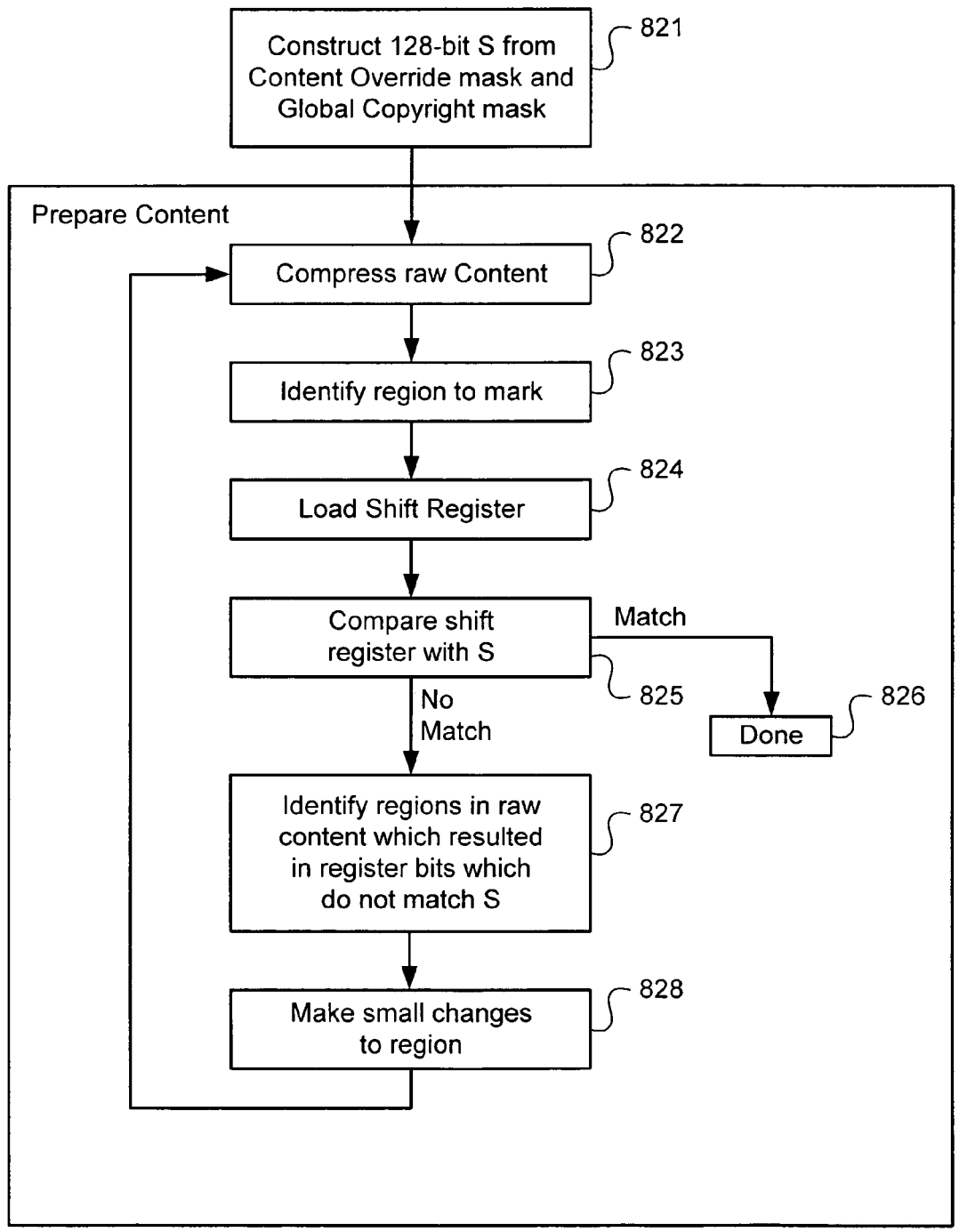
FIG. 8 describes the series of steps carried out by the publisher to copyright mark the digital content before it is written.

Referring again to FIG. 1, before sending the digital content (110) to the writer (130), publishers of digital content must use the CMS (120) to embed copyright identification marks in the content to produce marked content (125). FIG. 8 outlines the series of steps carried out by the publisher's CMS to add a copyright mark to the content.

The publisher begins by supplying the CMS with the raw content and a content override mask (X) generated as shown in FIG 5a. In step 821, a 128-bit mask S is constructed with the left-hand 64 bits set to the content override mask X and the lower 64 bits of set to the 64-bit global copyright mask to use. (If a message other than a copyright mark is to be embedded, S is loaded with the shift register state corresponding to the desired message. For example, the right half of S would be set to the data type identifier and the left half would contain the 64-bit message.)

Once S has been generated (821), the marked content can be prepared from the raw content. A wide variety of possible algorithms are available for embedding protection fields in content, but one simple approach is the "stop-and-go" method (820), in which the content producers:

(1) In step 822, convert the raw content into the format appropriate for writing. For example, if the output data is to be video, the raw image data would be compressed at this point. If the output data is executable code, this step could be program compilation. Some data types may not require any processing at this step.

(2) In step 823, identify the region to place a protection field. The region should be 128 blocks long, using whatever block size and block division algorithm is implemented in the writers.

(3) In step 824, process the 128 blocks using steps 240, 250, and 260 of FIG. 2. (Specifically, pre-process each step as necessary, compute the Hamming Majority of each, and load the Hamming Majority bits into the shift register.)

(4) In step 826, compare the 128-bit shift register obtained in step 824 with the desired state S. If they are equal, the mark has been successfully embedded and the process is complete (826). Otherwise, the process continues.

(5) In step 827, identify which content blocks have undesirable Hamming Majority values. These are the blocks whose Hamming Majority computations in step 3 ultimately caused a bit in the shift register to differ from S.

(6) In step 828, make minor changes to the content in the regions identified in step 827. With some data formats (particularly those which use data compressing), only block can be changed at a time since changes to one block may cause unpredictable changes to the Hamming Majority of subsequent blocks. If no compression is used, the changes should be designed to set and clear bits in the blocks to create the desired Hamming Majority.

(7) Go to step 1.

The reader will appreciate that this protection system can be combined with traditional encryption-based copy protection systems to provide the security advantages of both. Content can be embedded with copyright marks after it is encrypted, thereby preventing would-be attackers from copying the ciphertext. Content can also be marked before it is encrypted to provide copy resistance even if attackers recover the encryption keys from a player.

Although the publisher's goal is usually to prevent all copying of restricted content, some content may instead need to be protected under a "copy-once" policy. For example, content providers may want to allow television viewers to record digital television transmissions for time-shifting purposes without allowing unlimited copying of the content. To achieve this, the content is copyright-marked as before, but instead of keeping the authenticator secret, the publisher broadcasts it with the data. The consumer receives the authenticator in the broadcast and supplies it to his writer's LoadAuthenticator function, allowing the content to be recorded. However, the consumer's writer never writes the authenticator itself, and, without the authenticator, the recording cannot be recopied.

No practical copy prevention system provides perfect security. This system provides good protection, but can be attacked in a variety of ways. In particular, the protection can be defeated by altering the content to change enough Hamming Majority computation results that no global copyright masks are identifiable. However, there are many possible ways to make changes which will alter the Hamming Majority, but these changes are likely to introduce bugs in executable programs, clicks in audio data, artifacts in video data, etc. For data in which step 822 in FIG. 8 is effectively irreversible (such as program compilation), successful tampering can be extraordinarily difficult, especially if the number of copyright marks is large. For data such as compressed audio or video, attack may be feasible if attackers have the processing resources required to uncompress the data, slightly alter it, and recompress it. Note that while publication of the global copyright mask is needed for some systems, in others it may be preferable to keep it secret (simply to make attack slightly more difficult). Another likely attack involves modifying or bypassing the WCEP to prevent it from disabling unauthorized copying. However, if the WCEP is included inside a critical integrated circuit, the cost for this attack will be prohibitive. In general, the system cannot stop attackers with unlimited resources—such an attacker can build writers which do not adhere to the security model, for example—so judicial proceedings will still be required to stop well-funded piracy operations.

Other preferred embodiments of the invention will be apparent to those skilled in the art from a consideration of this specification or practice of the invention disclosed herein. It is intended that the specification and examples be considered as exemplary only, with the true scope and spirit of the invention being indicated by the following claims.

GLOSSARY

Authenticator: The authenticator (denoted with the variable Y) is a secret value generated by the publisher which enables a copyright-marked piece of content to be written.

Consumer: A purchaser of some protected content who may want to make unauthorized copies of it.

Content: Data which a publisher wishes to protect against unauthorized copying.

Content Marking System (CMS): A system used by the publisher to embed the global copyright mask and content override mask in content.

Content Override Mask: The content override mask (denoted with the variable X) is computed from the authenticator using a secure hash function. The content override mask is (along with the global copyright mask) embedded in the data by the CMS. A writer allows copyright-marked content to be written only if it has been supplied with an authenticator which hashes to the content override mask.

Global Copyright Mask: A global constant used to identify copyright-marked content.

Publisher: The owner of some content which is to be protected.

Reader: A device which reads content from a digital storage medium. In other embodiments, the reader can be a network interface, digital radio receiver, etc.

Writer: A device which writes content to a digital storage medium, such as a DVD, hard disk, etc. In other embodiments, the writer can be a network interface, broadcast mechanism, etc. Consumers and publishers both own writers, which can have identical capabilities.

Writer Copy Enhancement Processor (WCEP): A processor in each writer which rejects attempts to write copyright-marked data unless a proper authenticator has been provided.

What is claimed is:

1. A method for marking digital data to prevent the data from being copied or transmitted without authorization, the method comprising the steps of:
   selecting a global copyright mask M;
   generating an authenticator Y;
   using an electronic computing device, generating a content override mask X derived from Y using a one-way cryptographic function;
   selecting a data mask S to be a combination of X and M;
   using the data mask S to create marked data from the digital data; and
   transferring the marked data and Y to an entity configured to prevent copying or transmitting the marked data when the result of performing the one-way cryptographic function on Y is not detected in the marked data.

2. The method of claim 1 wherein the marked data includes additional embedded protection fields describing at least one action authorized by the data mask S.

3. The method of claim 1 wherein the marked data is compressed data.

4. The method of claim 1 wherein the marked data is in encrypted form.

5. The method of claim 1 wherein the marked data is allowed to be copied or transmitted when M is not found within the marked data.

6. The method of claim 1 wherein:
   a first party performs the steps of selecting M, generating Y, generating X, and selecting S; and the first party sends the marked data to a second party by supplying Y to a sending device associated with said first party.

7. The method of claim 6 wherein:

the first party sends Y to the second party;

the second party feeds Y to a writing device associated with the second party, enabling the marked data to be copied or transmitted by the second party once only; and the writing device inhibits further propagation of Y, thereby preventing the marked data from being copied or transmitted more than once.

8. The method of claim 1 wherein the marked data includes executable program code.

9. A computer-implemented method for determining whether a requested action is authorized to be performed on some digital content, said method comprising the steps of:

receiving a request for an action to be performed on digital content;

applying a non-collision-resistant compression function to a plurality of portions of said digital content;

applying a one-way cryptographic function to an authenticator value;

determining whether the result of applying said one-way function is represented in results of said applications of said compression function; and when said determining step finds that the result of applying said one-way function is so represented, allowing said requested action to be performed.

10. The method of claim 9 wherein said requested action includes making a copy of said digital content.

* * * * *